United States Patent [19]
Katata et al.

[11] Patent Number: 5,091,977
[45] Date of Patent: Feb. 25, 1992

[54] IMAGE DATA COMPRESSION METHOD USING A RUN PREDICTION TECHNIQUE

[75] Inventors: Hiroyuki Katata; Yoji Noguchi, both of Nara, Japan

[73] Assignee: Sharp Kabushiki Kaisha, Osaka, Japan

[21] Appl. No.: 630,200

[22] Filed: Dec. 19, 1990

[30] Foreign Application Priority Data

Dec. 19, 1989 [JP] Japan .................. 1-329316

[51] Int. Cl.$^5$ .................. G06K 9/36; H04N 1/41
[52] U.S. Cl. .................. 382/56; 358/261.1; 358/261.2
[58] Field of Search .................. 358/261.2, 261.1, 426; 382/56; 341/51, 59

[56] References Cited

U.S. PATENT DOCUMENTS

| | | | |
|---|---|---|---|
| 4,097,903 | 6/1978 | Nakagome et al. | 358/261 |
| 4,344,086 | 8/1982 | Mizuno | 358/78 |
| 4,360,840 | 11/1982 | Wolfrum et al. | 358/261 |
| 4,454,546 | 6/1984 | Mori | 358/260 |
| 4,701,803 | 10/1987 | Sato | 358/260 |
| 4,725,885 | 2/1988 | Gonzales et al. | 358/135 |

OTHER PUBLICATIONS

P. A. Stern et al., Facsimile Run Length Coding Uning Run Length Prediction (1974, pp. 170-176).
H. Shimora et al., "The Multi-Level Image Data Compression," Ricoh Technical Report No. 13, May 1985, pp. 13-21.

Primary Examiner—Leo H. Boudreau
Assistant Examiner—Andrew W. Johns

[57] ABSTRACT

In an image data compression method to be employed in coding digital image data whose pixels are represented by n bits and which include $2^n$ different types of runs, while a run length of a current run is counted, a value representing a run type of the current run is predicted. The prediction is repeated till a predicted value coincides with an actual value of the run type of the current run. When a predicted value does not coincide with the actual value of the run type of the current run, a run length for an imaginary run having the predicted value is regarded as zero and the run length 0 of the imaginary run is entropy coded. On the other hand, when a predicted value coincides with an actual value, the actual run length of the current run is entropy coded.

14 Claims, 7 Drawing Sheets

*Fig. 2*

$\underbrace{3\ 3\cdots\cdots 3}_{a}\ \underbrace{1\ 1\cdots\cdots 1}_{b}\ \underbrace{0\ 0\cdots\cdots 0}_{c}\ \underbrace{1\ 1\cdots\cdots 1}_{d}\ \underbrace{0\ 0\cdots\cdots 0}_{e}$

*Fig. 3*

| Headmost run | Run prediction |
|---|---|
| 0 | 1→2→3→2→1→0→··· |
| 1 | 2→3→2→1→0→1→··· |
| 2 | 3→2→1→0→1→2→··· |
| 3 | 2→1→0→1→2→3→··· |

Fig. 4

| Run length to be coded | a | 0 | b | c | d | 0 | 0 | e |
|---|---|---|---|---|---|---|---|---|
| Predicted value |  | 2 | 1 | 0 | 1 | 2 | 3 | 0 |

Fig. 5

| ... | A | H | H | H | ... | A | H | H | ... |

| r r r | r r | Predicted Values | | |
|---|---|---|---|---|
| | | First | Second | Third |
| 1 or 2 or 3 | 0 | 1 | 2 | 3 |
| 0 | 1 | 2 | 0 | 3 |
| 3 or 2 | 1 | 0 | 2 | 3 |
| 0 or 1 | 2 | 3 | 1 | 0 |
| 3 | 2 | 1 | 3 | 0 |
| 0 or 1 or 2 | 3 | 2 | 1 | 0 |

IMAGE DATA COMPRESSION METHOD USING A RUN PREDICTION TECHNIQUE

BACKGROUND OF THE INVENTION

The present invention generally relates to an image data compression method to be applied to image coding devices for reversibly coding n-bit images including characters, graphic patterns or the like (referred to as character images hereinbelow) with high efficiency.

Generally, in order to obtain a good character image with a comparatively low resolution, it is necessary to represent pixels of the image with multiple gray levels. A character image usually has character portions, white background and edge portions which are in the boundary between the character portions and the white background. In order to represent pixels of a character image with multiple gray level, pixels of the image are assigned respective values such as, for example, 0 for the character portions, $(2^n-1)$ for the white background, 1 to $(2^n-2)$ for the edge portions, wherein $n \geq 2$. Such n-bit image data are then coded.

Such pixel values are obtained by preprocessing image data read through a scanner, a camera, or the like.

FIG. 10 shows a prior art image data compression method employed in coding pixel values. The prior art method divides the n-bit image data into n bit planes and codes each bit plane by a run length coding method. According to the run length coding method, a long run can be compressed such that, instead of repeating the same data of the run, a code indicating the run length and a code indicating the type or value of the repeated data are inserted such that data compression is effected.

According to the prior data compression method using the bit plane dividing method as shown in FIG. 10, the binary data at the pixel positions representing a character portion are zeros (0) for all the bit planes, the binary data at the pixel positions representing white background are ones (1) for all the bit planes. That is, every bit on the bit planes carries same binary data at pixel positions for image portions other than the edge portions. However, because the edge portions occupies a very limited area in the image, the bit planes will have a pattern similar to each other. Therefore, it is inefficient to code these bit planes separately using the run length coding because too much redundancy is required.

SUMMARY OF THE INVENTION

An object of the present invention is to provide a data compression methods by which redundancy inherent in the above prior art data compression method is eliminated and an efficient coding can be effected.

According to the present invention, in an image data compression method to be employed in coding digital image data whose pixels are represented by n bits and which include $2^n$ different types of runs, while a run length of a current run is counted, a value representing a run type of the current run is predicted, said prediction is repeated till a predicted value coincides with an actual value of the run type of said current run; when a predicted value does not coincide with the actual value of the run type of said current run, a run length for an imaginary run having the predicted value is regarded as zero and said run length of the imaginary run is entropy coded; on the other hand, when a predicted value coincides with an actual value, the actual run length of the current run is entropy coded.

According to the method of the present invention, because values representing run types are obtained through prediction, it is not necessary to add n-bit information representing run types to respective run length data, unlike an usual run length coding. Therefore, if the prediction is effected with high precision, a total data amount can be reduced. In addition, even if there are many wrongly predicted values (this means that there are many run length data having the value zero), because those values are entropy coded (this means that if there are many run lengths of the value 0, a code of a short length is assigned to such run length data), a total data amount can be reduced in this case as well.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is an example of run data included in one line of an original image;

FIG. 3 is a diagram showing a method for predicting run types;

FIG. 4 is a diagram showing a relationship between the run length data and predicted values;

FIG. 5 is a format of compressed data;

DETAILED DESCRIPTION OF THE PREFERRED EMBODIMENTS

Figure 1:
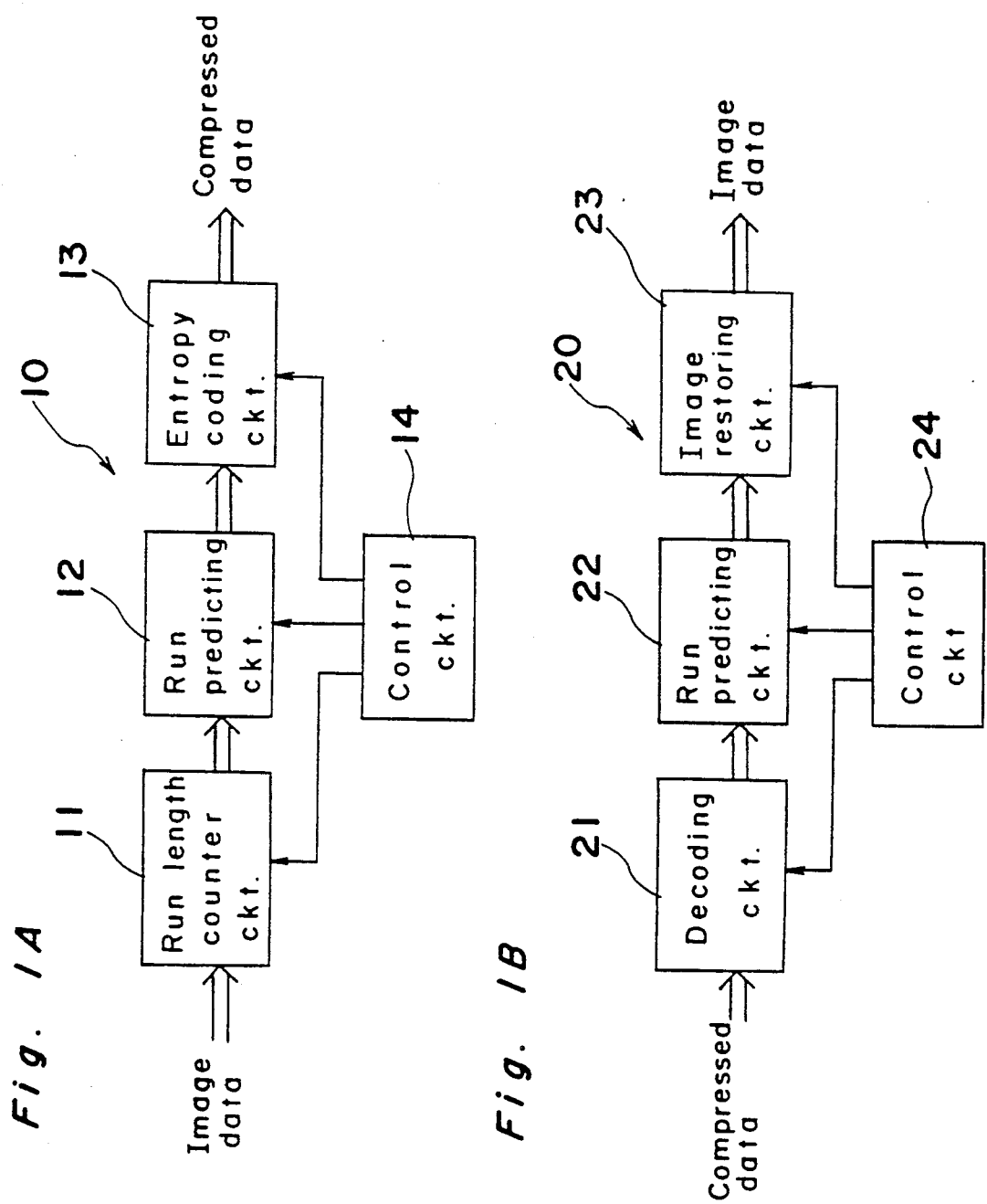
FIG. 1A is a block diagram showing a coder adopting an image data compression method of the present invention.
FIG. 1B is a block diagram showing a decoder adopting an image data compression method of the present invention.

FIG. 1A shows a block diagram of a coder for transforming n-bit image data to compressed data and FIG. 1B shows a block diagram of a decoder for restoring the compressed data back to the n-bit image data. The coder generally indicated by a reference numeral 10 has a run length counter circuit 11, a run predicting circuit 12 for predicting the type of runs, an entropy coding circuit 13 for entropy coding run length data, and a control circuit 14. The decoder 20 has a decoding circuit 21 for reading coded data, a run predicting circuit 22, an image restoring circuit 23 and a control circuit 24.

FIG. 2 shows an example of pixel value data contained in one line of an original two-bit character image. The following description will be made in reference with data of FIG. 2.

The two-bit character image is sequentially scanned in a horizontal direction from a top, left corner. Image data obtained through the scanning are inputted into a run length counter circuit 11, where run lengths of runs of four different types are counted. The types of runs are classified in accordance with values of the runs as follows: 0, 1, 2 and 3.

Line data are coded in the following manner.

The type and length of a headmost run in each line are stored. The type of each of runs following the headmost run in each line is predicted until a predicted value coincides with an actual value of the type. When the predicted value is different from the actual value of a run type, the predicted value is treated as if there were an imaginary run which is of the type having the predicted value but whose run length is zero. Therefore, the run length data "0" is recorded for the predicted value which does not coincide with the actual value. Such predicting process is repeated till a predicted value coincides with the actual value. When a predicted value coincides with the type of a run, actual run length data of the run detected by the run length counter circuit 11 is recorded. Then, prediction of a next run will start. For example, as shown in FIGS. 2 and 4, when a predicted value is 2 for the second run whose actual value is 1, the value 0 is recorded or stored as the run length for the run type 2. However, because a next predicted value 1 coincides with the actual value 1, the run length "b" of the instant run is counted and recorded. In the present case there are four different types of runs, as described above. Accordingly, the number of predictions is three or less.

The following describes a method for predicting the types of runs in detail in reference with FIGS. 3 and 4.

Generally, a character image has a construction wherein there is an edge portion in the boundary of a character and a white background. Therefore, it can be considered that when a character image is scanned, pixels for the white background will be followed by pixels for the edge portion, and then by pixels for the character portion, and then by pixels for the edge portion again, and then by pixels for the white background, and so on. Utilizing such a characteristic of a character image, the four types of runs are predicted to appear in the order of 3, 2, 1, 0, 1, 2, ..., in each line. However, the first predicted value varies in accordance with a headmost run of each line, as shown in FIG. 3.

It is to be noted that FIG. 3 shows cases wherein a predicted value coincides with an actual value of a run with a single prediction. If more than two predictions must be performed to a same run, a same predicted value should not be repeated and a predicted value should be different from the value of an immediately previous run. For example, in the case of line data as shown in FIG. 2, predicted values and run length data to be coded are as shown in FIG. 4.

In FIG. 4, predicted values appear in the order of 1, 2, 3, 0, not in the order of 1, 2, 3, 2, 1, 0 between "d" and "e" both inclusive. This is because of the aforementioned prediction rules that the same value, 2 in this case, should not be predicted twice and that a value identical with that of an immediately previous existing run, 1 in this case, is not used as a predicted value.

The run length data are entropy coded using a Hoffman codes, for example. When the entropy coding is carried out, use may be made of a code table preliminarily prepared based on sample data of character images or a code table which is considered as the most suitable to an image being processed of all code tables which have been prepared for different types of images by collecting the statistics of run lengths for each image. In addition, an entropy coding with universal codes will be available. A format of coded data will be as shown in FIG. 5, wherein a symbol "A" represents two bits indicating the type of a headmost run, and a symbol "H" represents entropy codes obtained by coding run lengths.

Figure 6:
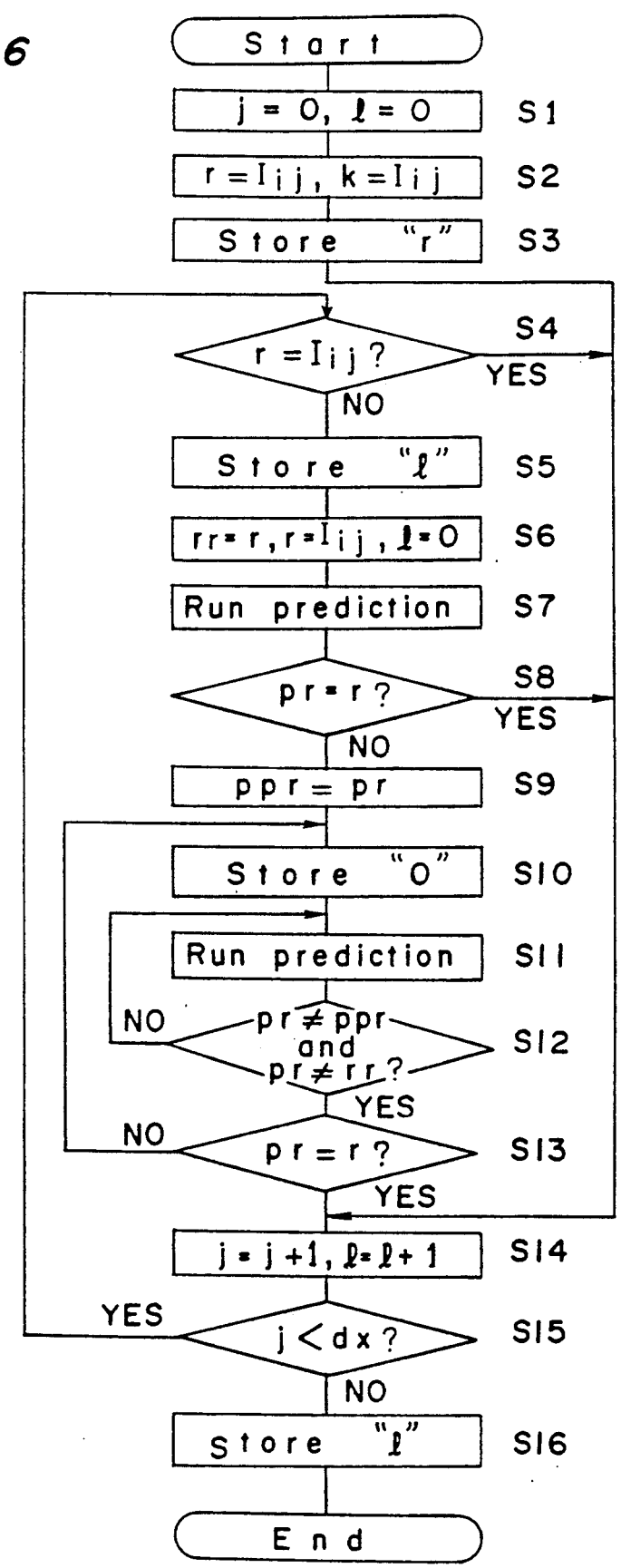
FIG. 6 is a flow chart for coding the one-line data according to an embodiment of the present invention.
Figure 7:
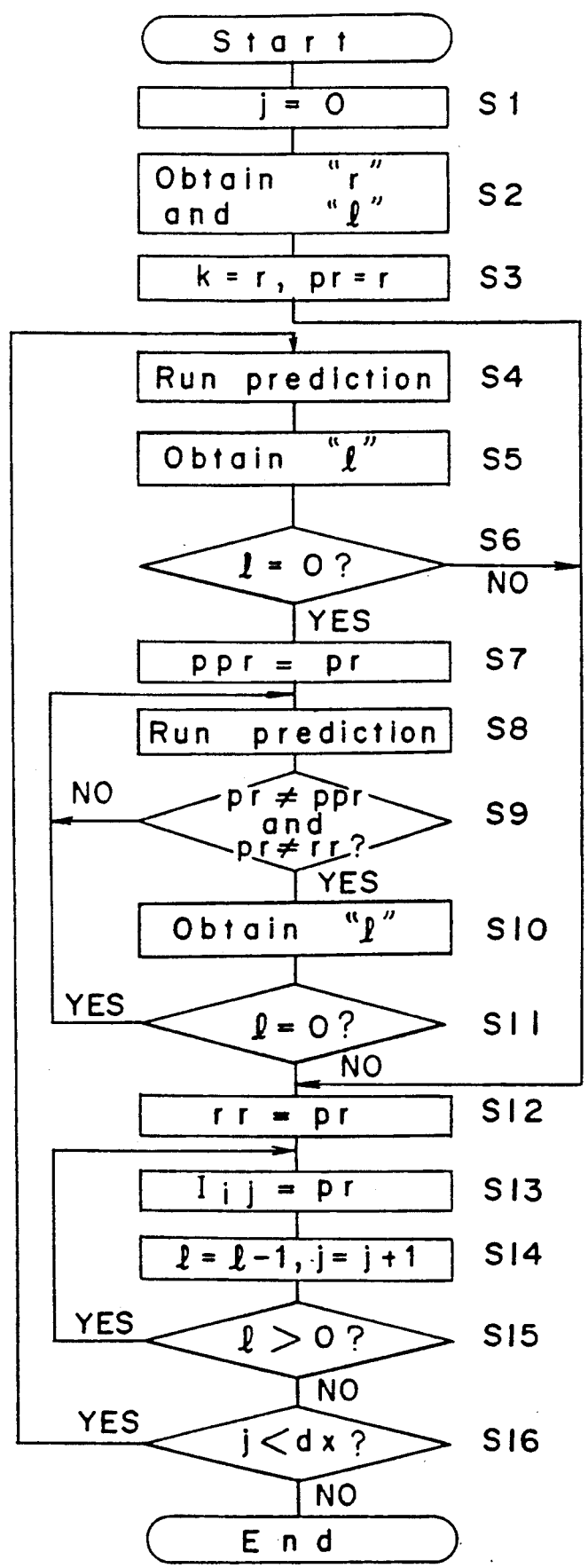
FIG. 7 is a flow chart for decoding the one-line data according to an embodiment of the present invention.

The above entropy coding of run lengths for one-line data of an image will be now described more in detail in reference with a flow chart in FIG. 6. FIG. 7 is a flow chart for decoding the coded run length data.

In the flow charts of FIGS. 6 and 7, $(i,j)$ represents coordinates of a pixel position, $I_{ij}$ represents a value of a pixel at the position $(i,j)$, "dx" represents the number of pixels in one line, "l" represents a run length, "r" represents the type of a run being processed, "rr" represents a type of the immediately preceding run, "pr" represents a predicted value of a run, and "ppr" represents the first predicted value for a run.

Figures 8, 9:
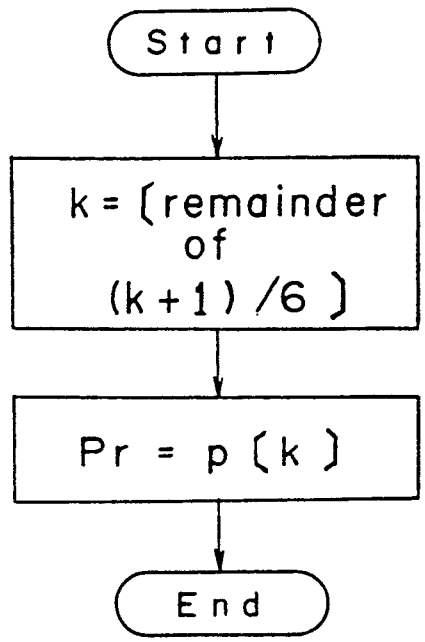
FIG. 8 is a flow chart showing processing in the steps named "run prediction" of FIGS. 6 and 7.
FIG. 9 is a diagram showing a method for predicting run types.
Figure 10:
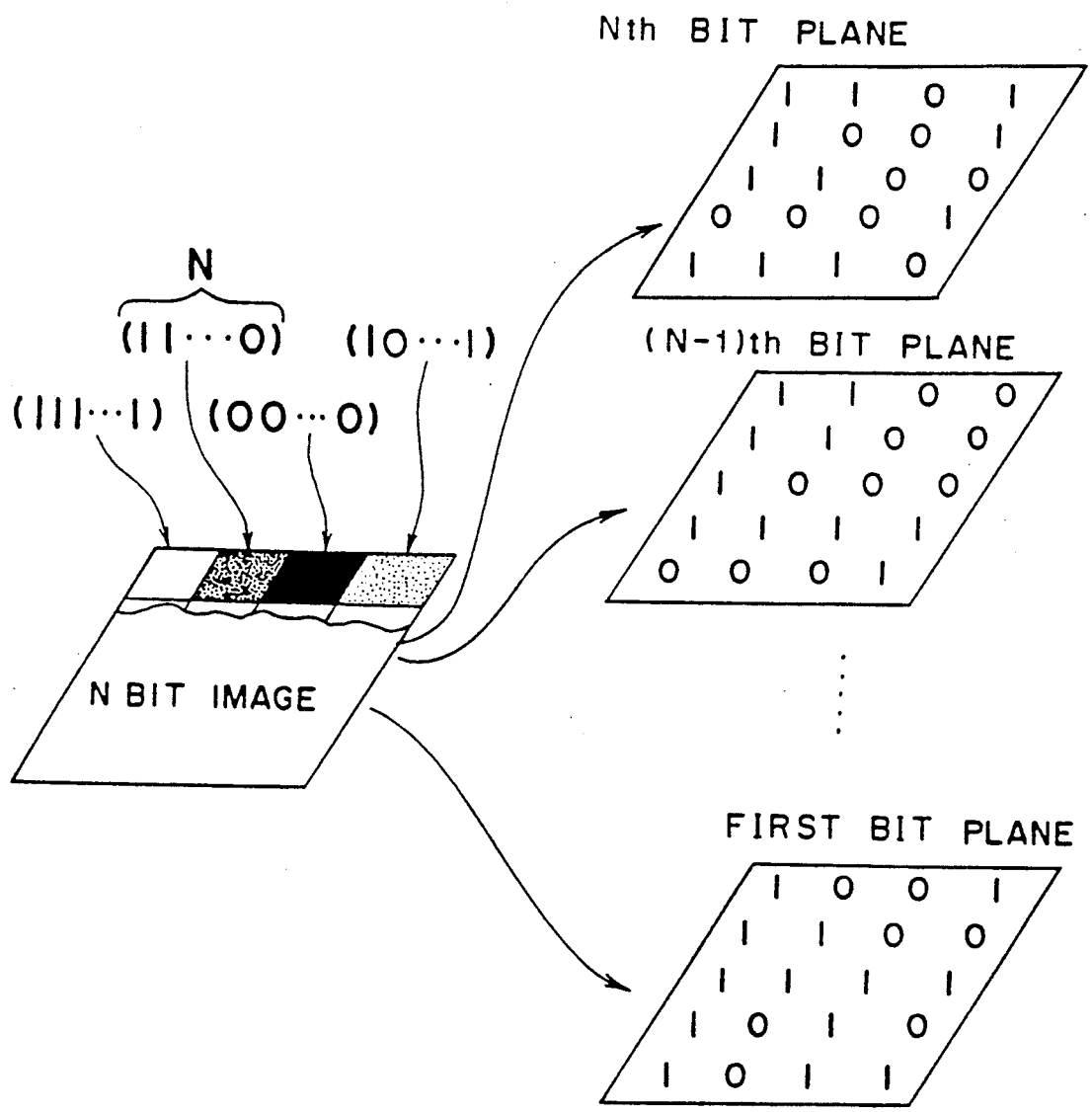
FIG. 10 is a prior art coding system wherein n-bit image data are divided into n bit planes.

FIG. 8 shows contents of a step named "Run prediction" in FIGS. 6 and 7. In FIG. 8, p[k](k=0, 1, 2, 3, 4, 5) is an arrangement of predicted values wherein there are six elements as follows: 0, 1, 2, 3, 2, and 1. The six elements are represented by their respective element numbers k (k=0, 1, 2, 3, 4 and 5). As will be readily understood, if a value indicating the type of a headmost run of a line is substituted into "k" first, "pr" can be sequentially obtained in the order as shown in FIG. 3 in the step of "Run prediction".

The flow charts of FIGS. 6 and 7 will now be described taking the data shown in FIG. 2 as example. In this case, i=0 and dx=a+b+c+d+e.

Referring first to FIG. 6, "j" and "l" are set to be j=l=0 at step S1. Then, at step S2, "r" (the type of a current run) and "k" are set to be $r=k=I_{00}$ (=3), the value 3 (r=3) is recorded as the type of a headmost run of a line at step S3. Then, at step S14, "j" and "l" are respectively set at one (j=0+1=1, l=0+1=1), the program proceeding to step S15. In this case, a discrimination result at step S15 will be j<dx, so that the program will go to step S4. At step S4, it is discriminated if $r=I_{ij}$. In the present case, r=3 and $I_{01}$=3 and therefore the program proceeds to step S14 again. From now, steps S15, S4 and S14 are repeated till "j" becomes "a" and "l" becomes "a" at step S14. When j=a and l=a at step S14, the program proceeds to step S4 via step S15. At step S4, r=3 and $I_{0a}$=1 are obtained, so that the program proceeds to step S5 at which l=a is stored. Thereafter, at step S6 "rr" (the preceding run type) is set as rr=r=3, and "r" and are respectively set to be $r=I_{0a}=1$, l=0. The following steps S7 to S13 are steps for predicting types of runs.

At step S7 the first predicted value "pr" will be 2 as shown in FIG. 3. In this case, because pr=2 and r=1 at step S8, the program proceeds to step S9 and "ppr" (the first predicted value of a run) is set at two (ppr=pr=2) at step S9 and then the value 0 is stored as the run length at step S10. Next, at step S11 for obtaining "pr", 1 is set as a predicted value as shown in FIG. 3. In this case, because pr=1, ppr=2 and rr=3, it is discriminated at step S12 that pr≠ppr and pr≠rr, so that the program proceeds to step S13. Because pr=1 and r=1, "pr" is discriminated to be equal to "r" at step S13 and the program proceeds to step S14.

Now, steps S14, S15 and S4 are repeated till "j" becomes "a+b" and "l" becomes "b" at step S14. When j=a+b and l=b at step S14, "r" becomes one (r=1) and $I_{0,a+b}$ becomes zero ($I_{0,a+b}$=0) and therefore "r" is judged as unequal to $I_{ij}$ at step S4. Then the program proceeds to step S5, at which "b" is stored as the run length 1 (l=b). At step S6, "rr", "r" and "l" are set at one, zero and zero, respectively (rr=1, r=0, l=0). At next step S7 for obtaining "pr", a predicted value "pr" will be 0 this time as shown in FIG. 3. Therefore, the program will proceed to step S14 via step S8.

Steps S14, S15 and S4 are again repeated till "j" becomes (a+b+c) and "l" becomes c (j=a+b+c, l=c) at step S14. When j=a+b+c, l=c at step S14, r=0 and $I_{0,a+b+c}=1$. Therefore, the program goes from step S4 to step S5 at which "c" is stored as the run length "l" for the run type 0. Then, at step S6, "rr", "r" and "l" are respectively set at zero, one and zero (rr=0, r=1, l=0). Because pr=1 is obtained this time as shown in FIG. 3 at step S7, the program proceeds to S14 via S8.

Steps S14, S15 and S4 are again repeated till "j" becomes (a+b+c+d) and l becomes d (j=a+b+c+d, l=d) at step S14. When j=a+b+c+d, l=d at step S14, r=1 and $I_{0,a+b+c+d}=0$. Therefore, the program goes from step S4 to step S5 at which "d", is stored as the run length "l" for the run type 1. Then, at step S6, "rr", "r" and "l" are respectively set at one, zero and zero (rr=1, r=0, l=0). Because a value predicted at step S7 at this time is two (pr=2), the program proceeds to step S8. Because pr=2 and r=0 in this case, "pr" is discriminated not to be equal to "r" at step S8, and the program proceeds to step S9. After "pr" (pr=2) is substituted into "ppr" (ppr=pr=2) at step S9, zero is recorded as the run length at step S10. Next, at step S11 being a predicting step, a predicted value pr=3 is obtained as shown in FIG. 3. Because pr=3, ppr=2 and rr=1, it is judged at step S12 that "pr" is unequal to "ppr" and "pr" is unequal to "rr". As a result, the program proceeds to step S13 at which "pr" (pr=3) is judged as unequal to "r" (r=0). The value 0 is stored as the run length at step S10.

The program returns to step S11 again, wherein the value 2 is presented as "pr". However because pr=2, ppr=2 and rr=1, and therefore ppr=pr, the program returns to step S11, at which a new predicted value 1 is obtained. However, because pr=1, ppr=2 and rr=1, and therefore pr=rr, the program again returns to step S11. Now, a predicted value "pr" is set at 0. In this case, because pr=0, ppr=2 and rr=1, the program proceeds to step S13 via S12. At step S13, "pr" (pr=0) is judged to be equal to "r" (r=0), so that the program proceeds to step S14.

Steps S14, S15 and S4 are again repeated till "j" becomes (a+b+c+d+e) and "l" becomes "e". When j=a+b+c+d+e and l=e at step S14, "j" becomes equal to dx (j=dx) at next step S15, the program proceeding to step S16 at which "e" is recorded as the run length (l=e). In this way the coding process is completed.

Referring next to FIG. 7, after "j" is set at zero (j=0) at step S1, r=3 and l=a are obtained from the coded data at step S2. At next step S3 "r" is used for "k" and "pr" (k=r=3, pr=r=3). Then the program proceeds to step S12, at which "pr" is used for "rr" (rr=pr=3). Steps S13, S14 and S15 are steps for expanding coded run lengths. Pixels the number of which is "a" are first restored at those steps S13-S15. Thereafter the program proceeds to step S16. Because j=a<dx (wherein dx=a+b+c+d+e), the program returns to step S4 for the run prediction, where pr=b 2 is obtained. Because the run length l obtained from the coded data at next step S5 is zero (l=0), the program proceeds to step S7 via step S6. The value 2 of "pr" is used for "ppr" (ppr=pr=2) at step S7. After the value 1 is obtained as "pr" (pr=1) at step S8, the program proceeds to step S10 via step S9 because pr=1, ppr=2, rr=3 and therefore pr≠ppr and pr≠rr. The run length "b" which is not zero is obtained at step S10. Because "l" is not zero (l≠0), the program proceeds to step S12, at which "rr" is replaced with pr to be one (rr=pr=1). After that, the b pixels are restored through processing at steps S13-S15 and then the program returns to step S4 for the run prediction via step S16 again.

pr=0 is this time at step S4. In this case, l=c≠0 obtained at step S5. Therefore the program proceeds to step S12 via S6 again. After rr is replaced with the value 0 of "pr" (rr=pr=0) at step S12, the c pixels are restored at steps S13-S15.

Similarly, the program proceeds to step S4 and 1 is obtained as a predicted value (pr=1) at this step. In this case, the run length l obtained at step S5 is "d" which is not zero (l=d≠0). Accordingly, the program proceeds to step S12 via step S6. The d pixels are restored at steps S13-S15 after "rr" is replaced with the value 1 of "pr" (rr=pr=1) at step S12.

The program again returns to step S4 via step S16. At this time a predicted value obtained at step S4 is two (pr=2) and the run length l obtained at step S5 is zero (l=0). Therefore the program proceeds from step S6 to step S7, at which the value 2 of "pr" is set as the value of "ppr" (ppr=pr=2). At step S8 the type of a run is predicted as 3 (pr=3). Because pr=3, ppr=2 and rr=1 at this time, the program proceeds from S9 to S10, at which the value 0 is set as the run length l of the run type 3. The next prediction result at step S8 is two (pr=2). In this case, however, because pr=ppr=2 and rr=1, a discrimination result at step S9 is NO and therefore the program returns to step S8 for the run prediction. Next, 1 is obtained as a predicted value "pr" at step S8. In this case, because pr=rr=1, a discrimination result at step S9 is NO and therefore the program returns to step S8 again. Next, pr=0 is obtained at step S8. In this case, because pr=0, ppr=2 and rr=1, the program proceeds from step S9 to step S10 where "e" is obtained as the run length for a run of the type 0 (l=e). Accordingly, a discrimination result at step S11 is NO and the program proceeds to step S15 via steps S12-S14. The e pixels are restored through the processing at step S12-S15. After the data restoration is completed, the program proceeds to step S16. At this time, "j" will be equal to dx (dx=a+b+c+d+e). Thus the above decoding process is completed.

An example of the present invention has been described above in reference with FIG. 6 and FIG. 7. In the above description, only one method has been presented as a method for predicting the run types. However, other methods will be available.

For example, in the case that appropriate preprocessing is not applied to a character image, so that a character portion and/or a white background contains pixels having values identical to those of pixels contained in an edge portion, or in the case that not only character images but also natural images are desired to be treated, the run type is not necessarily changed in the order 3, 2, 1, 0, 1, 2, . . . However, it can be considered that small changes such as "3, 2", "1, 0", or "1, 2" will occur more frequently than comparatively big changes such as "3, 0", "2, 0" or "3, 1". Accordingly, the run prediction will be carried out in accordance with a prediction rule as shown in FIG. 9 for the above cases.

As will be understood from FIG. 9, according to the prediction rule, three values closest to a value representing the preceding run type are nominated as the first, second and third predicted values. For example, when the preceding run type is 0, the value 1 is first nominated as the first predicted value. The values 2 and 3 follow the value 1 in this increasing order. When the preceding run type is 3, the value 2 is first nominated as the first predicted value. The values 1 and 0 follow the value 3 in this decreasing order. When the preceding run type "rr" is 1 or 2, there are two possible values as the closest one. For example, when the preceding run type "rr" is 1, the closest values are 2 and 0. In this case, priority is decided in consideration of the run type before the preceding run type. If the run type before the preceding run type "rrr" is 0, priority is given to the value 2 over the value 0, considering that values of run types being processed may be increasing. On the other hand, if the run type "rrr" before the preceding run type 1 is 3 or 2, priority is given to the value 0 over the value 2, considering that values of run types being processed may be decreasing.

In any case, when the first predicted value does not coincide with an actual run type, the two other values are provided one by one in accordance with priority as the second and third predicted values.

The above description has been made in reference with a two-bit character image. The present invention, however, can be applied to a reversible coding for any n-bit images. In this case, the number of run types to be predicted will be $2^n$.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A machine implemented image data compression method comprising the steps of:
   (a) inputting digital image data whose pixels are represented by n bits (where $n<1$) and which include $2^n$ different types of runs;
   (b) counting a run length of a current run of the digital image data
   (c) predicting a value representing a run type of the current run wherein said prediction is repeated until a predicted value is equal to an actual value of the run type of said current run;
   (d) setting a run length for an imaginary run having the predicted value to zero and entropy coding the run length of the imaginary run when the predicted value is not equal to the actual value of the run type of said current run;
   (e) entropy coding the actual run length of the current run when the predicted value is equal to with the actual value to produce compressed image data.
   (f) outputting the compressed image data.

2. The method of claim 1, wherein a run type of a headmost run in each line of the digital image data is obtained without being predicted and further comprising the step of:
   (g) adding n-bit data representing the run type of each headmost run to entropy coded run length data for each run following the headmost run.

3. The method of claim 2, wherein said predicted values are chosen in a predetermined order depending on a run type of each headmost run.

4. The method of claim 3, wherein step (c), if two or more predictions are made for a current run, an identical predicted value is not obtained and a value representing an actual type of an immediately previous run is not used as a predicted value for said current run.

5. The method of claim 3, wherein the digital image data is two-bit image data, and the predetermined order for the predicted values is 1, 2, 3, 2, 1, 0, and an initial predicted value for runs in each line of the image data is chosen based on a run type of a headmost run of each line.

6. The method of claim 1, wherein predicted values for a current run are prioritized based on a preceding run and a run before the preceding run.

7. The method of claim 6, wherein a predetermined number of values which are closest to a value representing a run type of a preceding run are selected as predicted values.

8. An image data compression apparatus comprising:
   input means for inputting digital image data whose pixels are represented by n-bits (where $n<1$) and which include $2^n$ in types of runs;
   counting means for counting a run length of the current run of the digital image data;
   predicting means for predicting a value representing a run type of a current run wherein said prediction is repeated until a predicted value is equal to an actual value of the run type of said current run;
   setting means for setting a run length for an imaginary run having the predicted value to zero, and entropy coding the run length of the imaginary run when the predicted value is not equal to the actual value of the run type of said current run;
   entropy coding means for entropy coding the actual run length of the current run to produce compressed image data; and
   output means for outputting the compressed image data.

9. The apparatus of claim 8, wherein a run type of a headmost run in each line of the digital image data is obtained without being predicted and further comprising:
   adding means for adding n-bit data representing the run type of each headmost run to entropy coded run length data for each run for following the headmost run.

10. The apparatus of claim 9, wherein said predicted values are chosen in a predetermine order depending on a run type of each headmost run.

11. The apparatus of claim 10, wherein said predicting means, if two or more predictions are made for a current run, an identical predicted value is not obtained and a value representing an actual type of an immediately previous run is not used as a predicted value for said current run.

12. The apparatus of claim 10, wherein the digital image data is two-bit image data and the predetermined order for the predicted values is 1, 2, 3, 2, 1, 0, and an initial predicted value for runs in each line of the image data is chosen based on a run type of a headmost run of each line.

13. The apparatus of claim 8, wherein predicted values for a current run are prioritized based on a preceding run and a run before the preceding run.

14. The apparatus of claim 13, wherein a predetermined number of values which are closest to a value representing a run type of a preceding run are selected as predicted values.

* * * * *